UNITED STATES PATENT OFFICE.

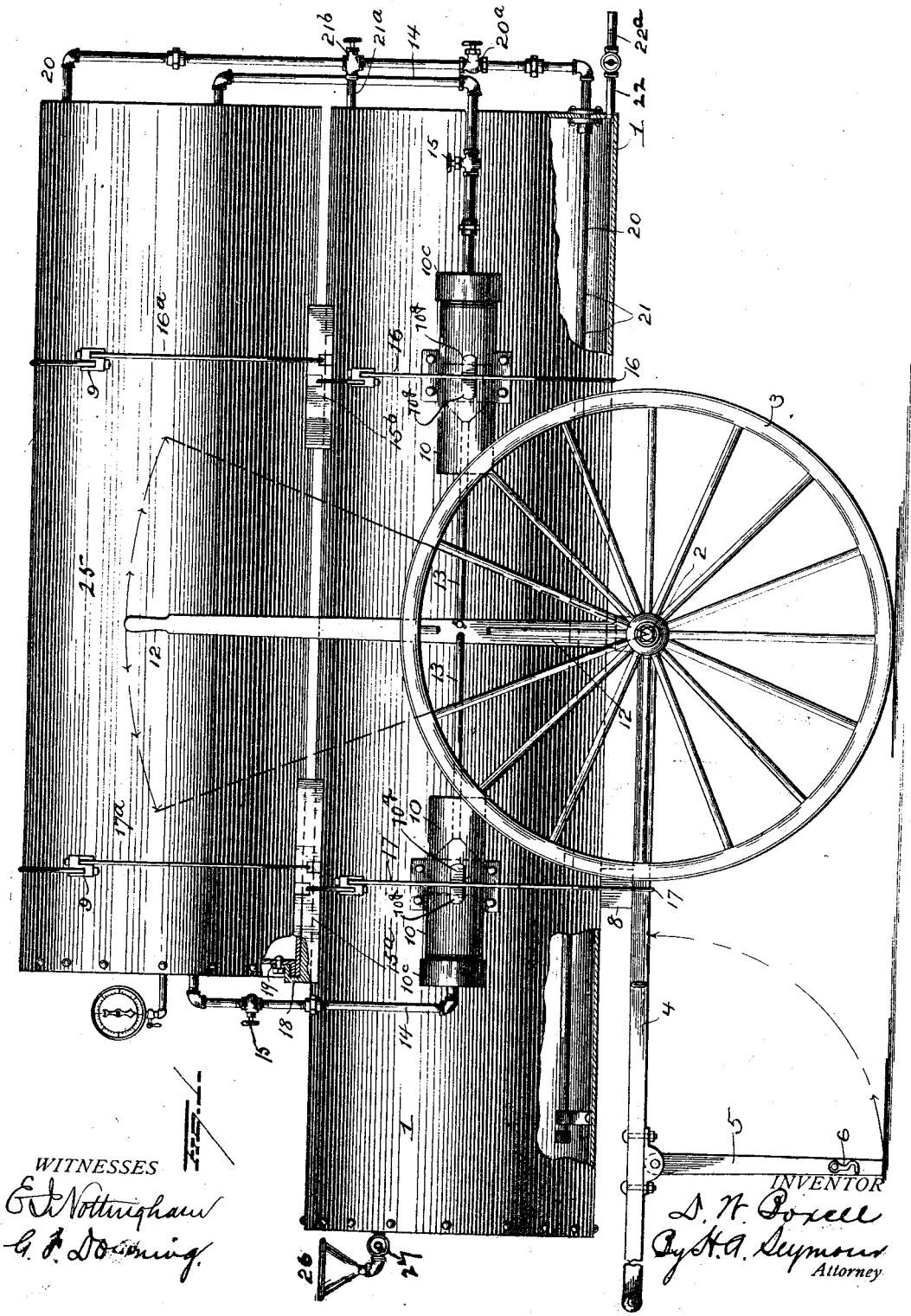

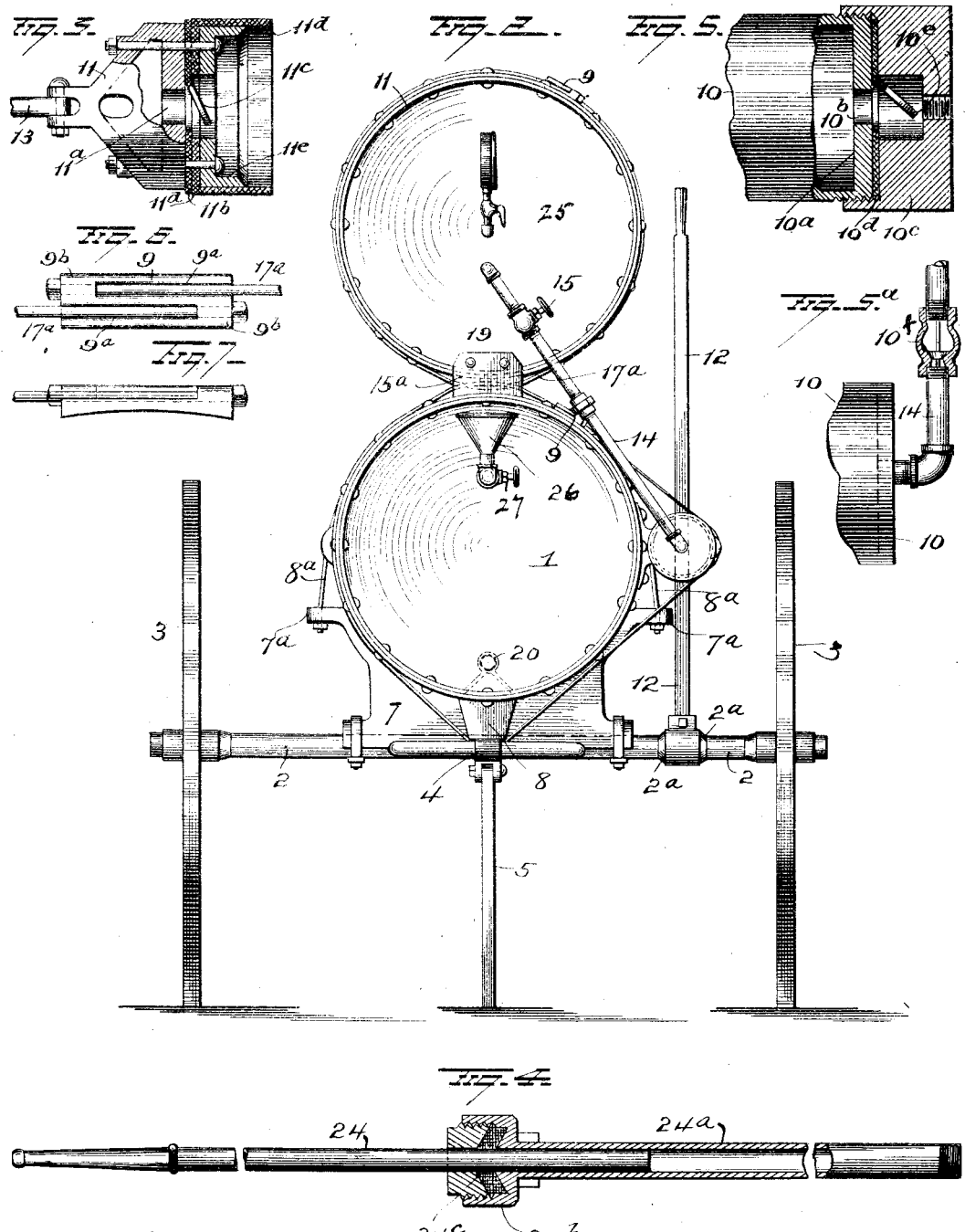

DAVID W. BOXELL, OF VAN BUREN, INDIANA.

SPRAYING-MACHINE.

1,060,423.  Specification of Letters Patent.  Patented Apr. 29, 1913.

Application filed May 18, 1912. Serial No. 698,251.

*To all whom it may concern:*

Be it known that I, DAVID W. BOXELL, of Van Buren, in the county of Grant and State of Indiana, have invented certain new and useful Improvements in Spraying-Machines; and I do hereby declare the following to be a full, clear, and exact description of the invention, such as will enable others skilled in the art to which it appertains to make and use the same.

My invention relates to improvements in spraying apparatus designed particularly for spraying fruit trees, shrubbery, plants, etc., with insecticide or other solutions, and the object is to provide a simple, effective and comparatively inexpensive device, that can be operated by hand, or other power for producing a continuous stream or spray.

My invention consists in the parts and combination of parts as will be more fully described and pointed out in the claims.

In the accompanying drawings, Figure 1 is a view in side elevation partly in section, of my improved apparatus. Fig. 2 is a view in front elevation of the same. Fig. 3 is a view in elevation, partly in section of one of the pistons. Fig. 4 is a view in elevation partly in section of the extensible spray pipe. Fig. 5 is a view partly in section of one of the pump cylinders, and Fig. 5ª is a modification thereof. Fig. 6 is a view in plan, and Fig. 7 is a view in side elevation of the tank securing hoops or bands coupling.

1 represents a liquid tank preferably cylindrical in shape, carried on the axle 2 and truck frame 4. The axle 2 is mounted in the wheels 3, and the frame 4, which may be a single tongue projecting forwardly from the axle, is rigidly secured to the latter. The tank and parts carried thereby, are preferably so mounted on the axle, that the preponderance of weight will be in front of the axle, so that when the apparatus is at rest, it may be sustained horizontally and in operative position by the leg 5 hinged to the frame 4, and adapted to rest on the ground, the leg being provided with a hook 6, by which it may be secured up against the truck frame 4 while the apparatus is being transported from one position to another.

The tank 1 is seated on the bolster 7 rigidly secured to the axle 2, and also rests on the block 8 secured to the frame 4. The bolster is curved to conform to the contour of the tank 1 and forms a cradle for same, and is provided at its ends with side extensions or brackets 7ª, to which the ends of the securing band 8ª are attached. This band 8ª is in one continuous piece and passes over and in contact with the top of the tank and is provided with threaded ends carrying nuts by which it is secured in place. The other bands 16 and 17 and 16ª and 17ª, which will be hereinafter described are made in sections connected by couplings 9 (shown in Figs. 6 and 7), each of which is provided with two parallel grooves 9ª, open at the top, one extending from a point adjacent one end of the coupling to the other end, and the other starting from adjacent the last mentioned end and extending to the first mentioned end, thus leaving two heads 9ᵇ one at each end, through which the ends of the band or hoop pass, nuts being secured to the ends of the bands, and bearing against the ends of the heads for securing the parts together. By this arrangement, each section of the hoop pulls against the other, but as the ends are separated, and the section of the hoops between the ends are free, I secure a resiliency or flexibility at the coupling, which cannot be secured by the ordinary turnbuckle.

Secured to one side of the tank 1 are the cylinders 10, each open at one end and located in the same horizontal line, with their open ends toward each other as shown in Fig. 1. The rear end of each cylinder is provided with a head 10ª having a central opening 10ᵇ, and each head is covered by a cap 10ᶜ screwed thereto and provided with a tapped opening for the attachment of a pipe leading to the air tank 25. Secured between the head 10ª of the cylinder and the cap 10ᶜ, is the leather disk 10ᵈ having a flap valve 10ᵉ integral therewith, the opening in the disk formed by the valve, being in line with the opening 10ᵇ in the head of the cylinder. The valve is somewhat larger than the opening in the head so as to seat thereagainst, and the cap 10ᶜ is provided with a cavity of a size sufficient to permit of the free movements of the valve. Instead of locating the valve in the cylinder head, the pipe 14 may be tapped directly to the head as shown in Fig. 5ª, and the valve 10ᶠ be located in said pipe at any point intermediate the pump and air tank.

Each piston comprises a hollow head 11 having air ingress openings 11ª and egress openings, a leather disk 11$^b$ having a flap valve 11$^c$ cut therefrom, a cup shaped leather or other suitable flexible packing 11$^d$, and a flanged cap plate 11$^e$. The disk 11$^b$ and packing 11$^d$ are secured between the head 11 and cap 11$^e$ by bolts passing through the several parts. The valve 11$^c$ closes the openings 11$^a$ in the head at each compressive stroke of the piston, and opens at each return stroke, while the cup-shaped packing 11$^d$ rests on and is supported by the flange of the cap and is constructed to expand and prevent the passage of air back and around the piston during the compressive stroke. There are two of these cylinders and valves as shown, constructed alike, and both pistons are connected to the operating lever 12 by the pitmen 13. The lever 12 is journaled on the axle 2 intermediate the shoulders 2$^a$, and the pitmen 13 are connected to the piston heads 11 by hinge joints, hence by reciprocating the lever, one piston will move in a direction to compress the air in its cylinder and the other inwardly so as to permit air to enter its cylinder. Each cylinder 10 is connected by a pipe 14 with the air tank 25. After the air has been forced into pipes 14 from the cylinders, it is prevented from returning by the flap valves 10$^a$, which will open under a pressure within the cylinders exceeding that of the pressure within tank 25, and which will immediately close as soon as the pressure within the cylinders is withdrawn, thus positively preventing the air in the tank 25 from passing back into the cylinders. Each pipe 14 is provided with a valve 15 by means of which communication between the cylinders and tank may be controlled. Tank 25 rests on the saddles 15$^a$ and 15$^b$ which latter are secured on the upper surface of liquid tank 1 by the bands 16 and 17. Each of these bands is formed of sections connected by a coupling 9 as previously described and each passes around a cylinder 10 and between bosses 10$^x$ integral with the latter. The band 16 engages the underside of liquid tank 1, while band 17 passes down under the frame 4. The two bands 16$^a$ and 17$^a$ are each formed in sections connected by a coupling 9 as previously described and each passes through a groove in the underside of saddles 15$^a$ and 15$^b$, and up and over air tank 25. Saddle 15$^a$ is provided at one end with a recess to receive the flange 18 of tank and is also provided with a flange 19 which is riveted to the head of tank 25, thus positively locking the latter to the saddle.

20 is a pipe extending from near the top of the air tank 25 to the bottom of liquid tank 1, and continues into and approximately throughout the length of the latter and is perforated as at 21, within the tank, so as to discharge the air into the liquid near the bottom of the tank, and thus keep the same agitated and prevent the settlement of solids. This pipe 20 is also provided at a point adjacent the top of tank 1, with a branch pipe 21$^a$ through which compressed air may be introduced into the tank above the liquid. Compressed air may be admitted either through perforations 21 or through branch pipe 21$^a$, or through both, and thus create a pressure sufficient within the tank to force the liquid therein out through discharge pipe 22, the pressure being sufficient to carry the spray to the top of the trees or other objects being treated. Pipe 20 is provided with a valve 20$^a$ for controlling the passage of air to the perforated pipe, and branch 21$^a$ is provided with a valve 21$^b$ for controlling the flow of air to it from pipe 20.

A hose 22$^a$ is attached to the discharge pipe 22 and an extensible nozzle is attached to the opposite end of the hose. This nozzle comprises two telescoping tubes 24—24$^a$ connected by a coupling 24$^b$ containing a packing 24$^c$ which prevents any leakage at the joint. By extending the nozzle it can be projected into dense shrubbery or foliage and reach parts that the spray could not otherwise reach.

Tank 1 is provided with a filling funnel 26 and valve 27, and the air tank is provided with a pressure gage for indicating the pressure within the tank 25.

The apparatus mounted on a two wheel truck can be readily transported by hand and set up at any point where needed. The air tank can then be filled to the desired pressure after which the operator can manipulate the nozzle, thus providing a construction that can be conveniently handled and operated by one person.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent is:

1. In a spraying apparatus, the combination with a wheeled truck, a liquid tank mounted on same, and an air tank carried by the liquid tank, of two cylinders located at opposite sides of the axle, a piston for each cylinder, pipes leading from the cylinders to the air tank, and a lever journaled on the axle of the truck and connected to both piston rods.

2. In a spraying apparatus, the combination of a liquid tank, saddles thereon, cylinders secured to the sides of the tank and bands embracing the saddles, tank and cylinders, an air tank seated on the saddles, piston and piston rod for each cylinder, a single lever for actuating both piston rods, pipes connecting the cylinders with the air tank and a pipe connecting the two tanks.

3. The combination of two superimposed tubular tanks, saddles resting on the lower tank and forming seats for the upper tank, bands passing around the lower tank and over the saddles, and bands passing around the upper tank and under the saddles whereby the two tanks are secured together.

4. In a spraying device, the combination with a liquid tank, saddles thereon, bands for securing the saddles in place, and an air tank seated on said saddles, one of said saddles having a recess at one end to receive a flange at the end of the air tank, and with a flange riveted to the head of the air tank, of means for creating an air pressure within the air tank and a pipe connecting the two tanks.

In testimony whereof, I have signed this specification in the presence of two subscribing witnesses.

DAVID W. BOXELL.

Witnesses:
HENRY A. LOZIER,
C. J. OVERMAN.